United States Patent
Sayyed et al.

(10) Patent No.: US 11,295,019 B2
(45) Date of Patent: Apr. 5, 2022

(54) SYSTEMS AND METHODS FOR DISAGGREGATED UPDATES TO SECONDARY OPERATING SYSTEM USING NETWORK-RETRIEVED SECURE FILE SYSTEM LAYOUT

(71) Applicant: Dell Products L.P., Round Rock, TX (US)

(72) Inventors: Ibrahim Sayyed, Georgetown, TX (US); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 251 days.

(21) Appl. No.: 16/795,926

(22) Filed: Feb. 20, 2020

(65) Prior Publication Data
US 2021/0264032 A1 Aug. 26, 2021

(51) Int. Cl.
*G06F 8/65* (2018.01)
*G06F 21/57* (2013.01)
*G06F 9/4401* (2018.01)
*G06F 16/182* (2019.01)
*G06F 9/44* (2018.01)

(52) U.S. Cl.
CPC .............. *G06F 21/575* (2013.01); *G06F 8/65* (2013.01); *G06F 9/4406* (2013.01); *G06F 9/4416* (2013.01); *G06F 16/182* (2019.01); *G06F 21/572* (2013.01); *G06F 2221/034* (2013.01)

(58) Field of Classification Search
CPC ........ G06F 21/575; G06F 8/65; G06F 9/4406; G06F 9/4416; G06F 16/182; G06F 21/572; G06F 2221/034; G06F 9/441; G06F 21/57
USPC ................................................ 713/1, 2, 100
See application file for complete search history.

(56) References Cited

U.S. PATENT DOCUMENTS

| | | | |
|---|---|---|---|
| 2004/0153724 A1* | 8/2004 | Nicholson | ........... G06F 11/1417 714/6.11 |
| 2008/0168310 A1* | 7/2008 | Saretto | ................ G06F 11/1417 714/30 |

* cited by examiner

*Primary Examiner* — Michael J Brown
(74) *Attorney, Agent, or Firm* — Jackson Walker L.L.P.

(57) ABSTRACT

A basic input/output system may be configured to, during a boot of the information handling system and responsive to a condition for launching the secondary operating system: initialize a network driver for communicating with a network via a network interface, download from a secure, verified network location within the network a security manifest file for a most recent version of the secondary operating system, the security manifest file comprising metadata regarding a file system layout for the most recent version of the secondary operating system, based on the file system layout of the security manifest file and an actual file system layout of the secondary operating system as stored within an information handling system, determine one or more portions of the secondary operating system requiring update, and download the one or more portions of the secondary operating system and apply the one or more portions to the secondary operating system as stored within the information handling system.

12 Claims, 2 Drawing Sheets

SYSTEMS AND METHODS FOR DISAGGREGATED UPDATES TO SECONDARY OPERATING SYSTEM USING NETWORK-RETRIEVED SECURE FILE SYSTEM LAYOUT

TECHNICAL FIELD

The present disclosure relates in general to information handling systems, and more specifically to performing disaggregated updates to a secondary operating system using a network-retrieved secure file system layout.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some instances, an information handling system may be configured to boot to a secondary operating system (e.g., a service operating system, recovery operating system, or rescue operating system) when it is unable to boot to a primary host operating system of the information handling system. The secondary operating system may either be installed in a hidden partition of an internal storage resource (e.g., hard drive) of the information handling system or in an external storage resource (e.g., a Universal Serial Bus drive) that may be coupled to the information handling system. Such secondary operation system may be configured to perform one or more repair/recovery tasks, including executing diagnostics, repairing a system registry, or reinstalling the primary operating system from a factory image or other source image.

In the event of a failure of a primary operating system to boot, should a secondary operating system be missing from its dedicated partition of a storage resource of an information handling system, a basic input/output system (BIOS) of the information handling system may be capable of executing pre-boot network drivers to download a secondary operating system image. However, due to the large size of a secondary operating system image, downloading a secondary operating system may take a significant amount of time (e.g., 8-10 minutes using existing network bandwidth speeds).

SUMMARY

In accordance with the teachings of the present disclosure, the disadvantages and problems associated with network download of a secondary operating system may be reduced or eliminated.

In accordance with embodiments of the present disclosure, an information handling system comprising may include a processor, non-transitory computer readable media communicatively coupled to the processor and having stored thereon a primary operating system of the information handling system and a secondary operating system of the information handling system, a network interface communicatively coupled to the processor and configured to couple the information handling system to a network, and a basic input/output system communicatively coupled to the processor and configured to, during a boot of the information handling system and responsive to a condition for launching the secondary operating system: initialize a network driver for communicating with the network via the network interface, download from a secure, verified network location within the network a security manifest file for a most recent version of the secondary operating system, the security manifest file comprising metadata regarding a file system layout for the most recent version of the secondary operating system, based on the file system layout of the security manifest file and an actual file system layout of the secondary operating system as stored within the information handling system, determine one or more portions of the secondary operating system requiring update, and download the one or more portions of the secondary operating system and apply the one or more portions to the secondary operating system as stored within the information handling system.

In accordance with these and other embodiments of the present disclosure, a method may be provided for use in an information handling system comprising a non-transitory computer readable media communicatively coupled to the processor and having stored thereon a primary operating system of the information handling system and a secondary operating system of the information handling system and a network interface communicatively coupled to the processor and configured to couple the information handling system to a network. The method may include, during a boot of the information handling system and responsive to a condition for launching the secondary operating system: (i) initializing, with a basic input/output system of the information handling system, a network driver for communicating with the network via the network interface; (ii) downloading, with the basic input/output system, from a secure, verified network location within the network a security manifest file for a most recent version of the secondary operating system, the security manifest file comprising metadata regarding a file system layout for the most recent version of the secondary operating system; (iii) based on the file system layout of the security manifest file and an actual file system layout of the secondary operating system as stored within the information handling system, determining, with the basic input/output system, one or more portions of the secondary operating system requiring update; and (iv) downloading, with the basic input/output system, the one or more portions of the secondary operating system and apply the one or more portions to the secondary operating system as stored within the information handling system.

In accordance with these and other embodiments of the present disclosure, an article of manufacture may include a computer readable medium and computer-executable instructions carried on the computer readable medium, the instructions readable by a processor, the instructions, when read and executed, for causing the processor to, in an information handling system comprising a non-transitory computer readable media communicatively coupled to the processor and having stored thereon a primary operating system of the information handling system and a secondary operating system of the information handling system and a network interface communicatively coupled to the processor and configured to couple the information handling system to a network, during a boot of the information handling system and responsive to a condition for launching the secondary operating system: (i) initialize, with a basic input/output system of the information handling system, a network driver for communicating with the network via the network interface; (ii) download, with the basic input/output system, from a secure, verified network location within the network a security manifest file for a most recent version of the secondary operating system, the security manifest file comprising metadata regarding a file system layout for the most recent version of the secondary operating system; (iii) based on the file system layout of the security manifest file and an actual file system layout of the secondary operating system as stored within the information handling system, determine, with the basic input/output system, one or more portions of the secondary operating system requiring update; and (iv) download, with the basic input/output system, the one or more portions of the secondary operating system and apply the one or more portions to the secondary operating system as stored within the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
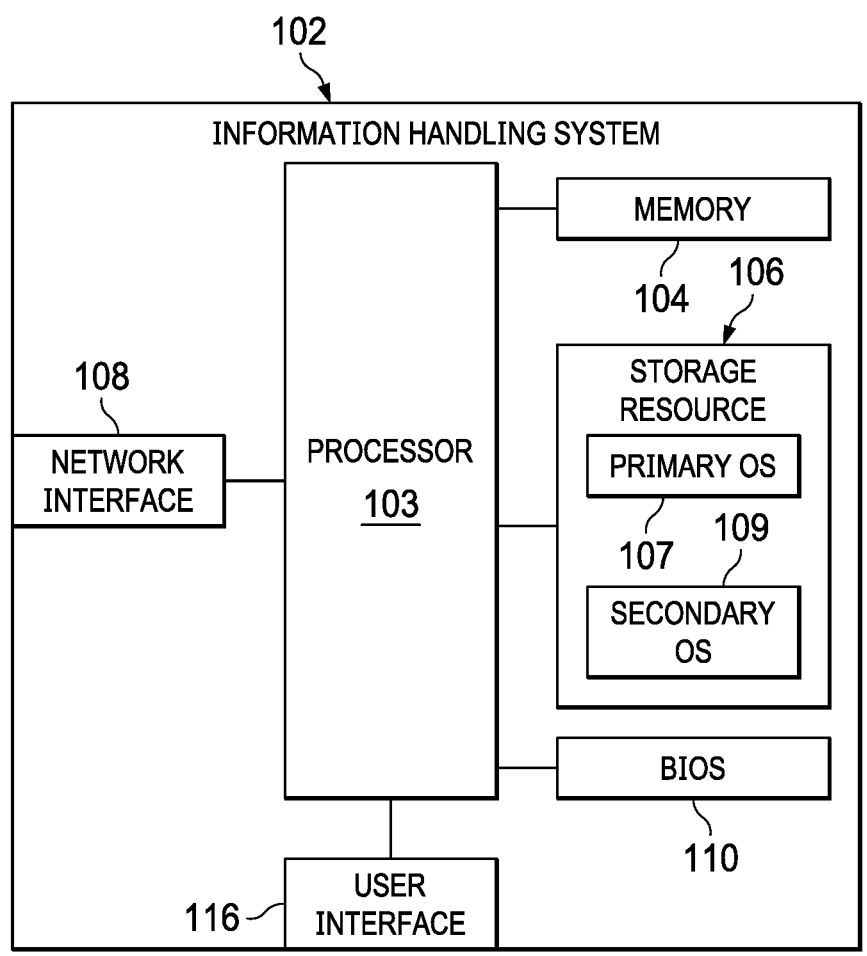
FIG. 1 illustrates a block diagram of an example information handling system, in accordance with certain embodiments of the present disclosure.
Figure 2:
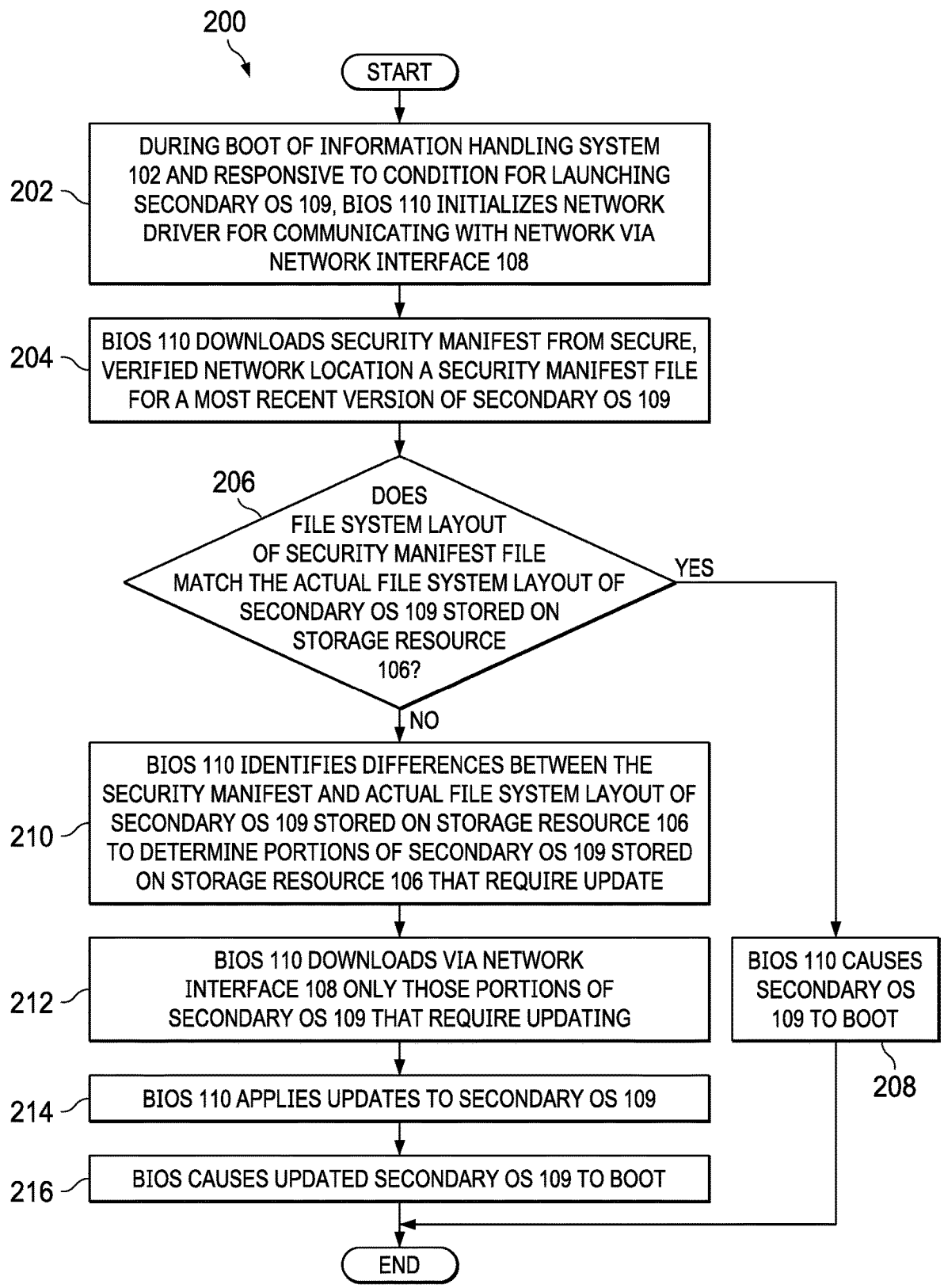
FIG. 2 illustrates a flow chart of an example method for disaggregated updates to a secondary operating system using a network-retrieved secure file system layout, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a storage resource 106 communicatively coupled to processor 103, a network interface 108 communicatively coupled to processor 103, a basic input/output system (BIOS) 110 communicatively coupled to processor 103, and a user interface 116 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. In some embodiments, storage resource 106 may reside internal to a chassis or other enclosure comprising information handling system 102 and not be readily accessible without opening such chassis or other enclosure. In other embodiments, storage resource 106 may reside internal to a chassis or other enclosure comprising information handling system 102. As shown in FIG. 1, storage resource 106 may have stored thereon a primary, or host, operating system (OS) 107 and a secondary OS 109.

Primary operating system 107 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by OS 107. Active portions of OS 107 may be transferred from storage resource 106 to memory 104 for execution by processor 103.

Secondary OS 109 may comprise any program of executable instructions, or aggregation of programs of executable instructions, configured as a special-purpose OS to perform diagnostics, recovery, and/or repair to primary OS 107 and/or other components of information handling system 102. In some embodiments, secondary OS 109 may be stored in a hidden partition of storage resource 106, and may be configured to boot in lieu of primary OS 107 if information handling system 102 is unable to boot to primary OS 107.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102. As described in greater detail below, BIOS 110 may also be configured to manage and/or perform disaggregated updates to a secondary operating system using a network-retrieved secure file system layout.

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

In operation, BIOS 110 may, on a boot of information handling system 102 and responsive to a condition for launching secondary OS 109 (e.g., failure to boot primary OS 107, user input indicating a desire to boot to secondary OS 109, etc.), initialize a network driver for communicating with a network via network interface 108. Further, BIOS 110 may download from a secure, verified network location (e.g., from an Internet Uniform Resource Locator identified within secure BIOS firmware executing during boot) a security manifest file for a most recent version of secondary OS 109, the security manifest file comprising metadata regarding a file system layout for the most recent version of secondary OS 109. In addition, BIOS 110 may compare the file system layout of the security manifest file to the actual file system layout of secondary OS 109 stored on storage resource 106. If the file system layout of the security manifest file matches the actual file system layout of secondary OS 109 stored on storage resource 106, then BIOS 110 may cause secondary OS 109 to boot. On the other hand, if the file system layout of the security manifest does not match the actual file system layout of secondary OS 109 stored on storage resource 106, BIOS 110 may identify the differences between the security manifest and the actual file system layout of secondary OS 109 stored on storage resource 106 to determine those portions of secondary OS 109 stored on storage resource 106 that require update (e.g., either due to being outdated or corrupted). BIOS 110 may then download via network interface 108 only those portions of secondary OS 109 that require updating, and then apply such updates to secondary OS 109. After updates to secondary OS 109 are complete, BIOS 110 may then cause the updated secondary OS 109 to boot.

FIG. 2 illustrates a flow chart of an example method 200 for disaggregated updates to secondary OS 109 using a network-retrieved secure file system layout, in accordance with certain embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, during a boot of information handling system 102 and responsive to a condition for launching secondary OS 109 (e.g., failure to boot primary OS 107, user input indicating a desire to boot to secondary OS 109, etc.), BIOS 110 may initialize a network driver for communicating with a network via network interface 108. At step 204, BIOS 110 may download via network interface 108 from a secure, verified network location (e.g., from an Internet Uniform Resource Locator identified within secure BIOS firmware executing during boot) a security manifest file for a most recent version of secondary OS 109, the security manifest file comprising metadata regarding a file system layout for the most recent version of secondary OS 109.

At step 206, BIOS 110 may compare the file system layout of the security manifest file to the actual file system layout of secondary OS 109 stored on storage resource 106. If the file system layout of the security manifest file matches the actual file system layout of secondary OS 109 stored on storage resource 106, method 200 may proceed to step 208. Otherwise, method 200 may proceed to step 210. At step 208, responsive to the file system layout of the security manifest file matching the actual file system layout of secondary OS 109 stored on storage resource 106, BIOS 110 may cause secondary OS 109 to boot. After completion of step 208, method 200 may end.

At step 210, BIOS 110 may identify the differences between the security manifest and the actual file system layout of secondary OS 109 stored on storage resource 106 to determine those portions of secondary OS 109 stored on storage resource 106 that require update (e.g., either due to being outdated or corrupted). At step 212, BIOS 110 may download via network interface 108 only those portions of secondary OS 109 that require updating. At step 214, BIOS 110 may apply such updates to secondary OS 109.

At step 216, after updates to secondary OS 109 are complete, BIOS 110 may cause the updated secondary OS 109 to boot. After completion of step 216, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:
1. An information handling system comprising:
a processor;
non-transitory computer readable media communicatively coupled to the processor and having stored thereon a primary operating system of the information handling system and a secondary operating system of the information handling system;

a network interface communicatively coupled to the processor and configured to couple the information handling system to a network; and a basic input/output system communicatively coupled to the processor and configured to, during a boot of the information handling system and responsive to a condition for launching the secondary operating system:

initialize a network driver for communicating with the network via the network interface;

download from a secure, verified network location within the network a security manifest file for a most recent version of the secondary operating system, the security manifest file comprising metadata regarding a file system layout for the most recent version of the secondary operating system;

based on the file system layout of the security manifest file and an actual file system layout of the secondary operating system as stored within the information handling system, determine one or more portions of the secondary operating system requiring update; and download the one or more portions of the secondary operating system and apply the one or more portions to the secondary operating system as stored within the information handling system.

2. The information handling system of claim 1, wherein the basic input/output system is further configured to cause the information handling system to boot to the secondary operating system as updated.

3. The information handling system of claim 1, wherein the basic input/output system is configured to determine the one or more portions of the secondary operating system requiring update by:

comparing the file system layout of the security manifest file and the actual file system layout of the secondary operating system as stored within the information handling system; and identifying the differences between the file system layout of the security manifest file and the actual file system layout of the secondary operating system as stored within the information handling system.

4. The information handling system of claim 1, wherein the basic input/output system is further configured to cause the information handling system to boot to the secondary operating system without any update to the secondary operating system if the file system layout of the security manifest file matches the actual file system layout of the secondary operating system as stored within the information handling system.

5. A method, in an information handling system comprising a non-transitory computer readable media communicatively coupled to the processor and having stored thereon a primary operating system of the information handling system and a secondary operating system of the information handling system and a network interface communicatively coupled to the processor and configured to couple the information handling system to a network, the method comprising, during a boot of the information handling system and responsive to a condition for launching the secondary operating system:

initializing, with a basic input/output system of the information handling system, a network driver for communicating with the network via the network interface;

downloading, with the basic input/output system, from a secure, verified network location within the network a security manifest file for a most recent version of the secondary operating system, the security manifest file comprising metadata regarding a file system layout for the most recent version of the secondary operating system;

based on the file system layout of the security manifest file and an actual file system layout of the secondary operating system as stored within the information handling system, determining, with the basic input/output system, one or more portions of the secondary operating system requiring update; and downloading, with the basic input/output system, the one or more portions of the secondary operating system and apply the one or more portions to the secondary operating system as stored within the information handling system.

6. The method of claim 5, further comprising causing, with the basic input/output system, the information handling system to boot to the secondary operating system as updated.

7. The method of claim 5, wherein determining the one or more portions of the secondary operating system requiring update comprises:

comparing the file system layout of the security manifest file and the actual file system layout of the secondary operating system as stored within the information handling system; and identifying the differences between the file system layout of the security manifest file and the actual file system layout of the secondary operating system as stored within the information handling system.

8. The method of claim 5, further comprising causing, with the basic input/output system, the information handling system to boot to the secondary operating system without any update to the secondary operating system if the file system layout of the security manifest file matches the actual file system layout of the secondary operating system as stored within the information handling system.

9. An article of manufacture comprising:

a non-transitory computer readable medium; and computer-executable instructions carried on the computer readable medium, the instructions readable by a processor, the instructions, when read and executed, for causing the processor to, in an information handling system comprising a non-transitory computer readable media communicatively coupled to the processor and having stored thereon a primary operating system of the information handling system and a secondary operating system of the information handling system and a network interface communicatively coupled to the processor and configured to couple the information handling system to a network, during a boot of the information handling system and responsive to a condition for launching the secondary operating system:

initialize, with a basic input/output system of the information handling system, a network driver for communicating with the network via the network interface;

download, with the basic input/output system, from a secure, verified network location within the network a security manifest file for a most recent version of the secondary operating system, the security manifest file comprising metadata regarding a file system layout for the most recent version of the secondary operating system;

based on the file system layout of the security manifest file and an actual file system layout of the secondary operating system as stored within the information handling system, determine, with the basic input/ output system, one or more portions of the secondary operating system requiring update; and download, with the basic input/output system, the one or more portions of the secondary operating system and apply the one or more portions to the secondary operating system as stored within the information handling system.

10. The article of claim 9, the instructions for further causing the processor to, with the basic input/output system, cause the information handling system to boot to the secondary operating system as updated.

11. The article of claim 9, wherein determining the one or more portions of the secondary operating system requiring update comprises:

comparing the file system layout of the security manifest file and the actual file system layout of the secondary operating system as stored within the information handling system; and identifying the differences between the file system layout of the security manifest file and the actual file system layout of the secondary operating system as stored within the information handling system.

12. The article of claim 9, the instructions for further causing the processor to, with the basic input/output system, cause the information handling system to boot to the secondary operating system without any update to the secondary operating system if the file system layout of the security manifest file matches the actual file system layout of the secondary operating system as stored within the information handling system.

* * * * *